United States Patent
Da Rocha et al.

(10) Patent No.: US 6,928,274 B2
(45) Date of Patent: Aug. 9, 2005

(54) RECEIVER DEVICE FOR A MOBILE RADIOCOMMUNICATION UNIT EMPLOYING A SPEED ESTIMATOR

(75) Inventors: Alexandre Da Rocha, Puteaux (FR); Michael Guilbaud, Argenteuil (FR)

(73) Assignee: Alcatel, Paris (FR)

( * ) Notice: Subject to any disclaimer, the term of this patent is extended or adjusted under 35 U.S.C. 154(b) by 665 days.

(21) Appl. No.: 09/941,707

(22) Filed: Aug. 30, 2001

(65) Prior Publication Data

US 2002/0042279 A1 Apr. 11, 2002

(30) Foreign Application Priority Data

Aug. 31, 2000 (FR) ............................................ 00 11118

(51) Int. Cl.⁷ ................................................. H04B 1/18
(52) U.S. Cl. .................................... 455/226.2; 455/423
(58) Field of Search ................................ 370/519, 351, 370/227, 228, 236, 238, 365, 468, 476; 367/118, 125; 333/1, 5; 379/219, 220.01, 293; 455/18, 20, 23, 42, 59, 60, 225

(56) References Cited

U.S. PATENT DOCUMENTS 5,513,221 A * 4/1996 Parr et al. .................... 375/344
5,912,886 A * 6/1999 Takahashi et al. .......... 370/350
6,463,049 B1 * 10/2002 Abe et al. .................... 370/347
6,539,004 B1 * 3/2003 Sawyer ........................ 370/331

FOREIGN PATENT DOCUMENTS

GB 2276064 9/1994

OTHER PUBLICATIONS

M. Sakamoto et al, "Adaptive Channel Estimation with Velocity Estimator for W–CDMA Receiver", Vehicular Tecnology Conference Proceedings, 2000, Spring, Tokyo, 2000, IEEE 51$^{ST}$, vol. 3, May 15–18, 2000, pp. 2024–2028, XP002168101.

* cited by examiner

Primary Examiner—Fan Tsang
Assistant Examiner—Ming Chow
(74) Attorney, Agent, or Firm—Sughrue Mion, PLLC

(57) ABSTRACT

A receiver device for a mobile radiocommunication unit communicating with a base station via a propagation channel includes a pathfinder for determining the time-delays associated with a multipath signal, a channel estimator supplying an estimate of the propagation channel to a filter unit, which can be made up of a bank of Wiener filters, which optimizes the estimates of the propagation channel, and to a speed estimator that supplies the estimated speed of the mobile radio communication unit to the filter unit so as to select the appropriate filter corresponding to the speed estimate.

8 Claims, 4 Drawing Sheets

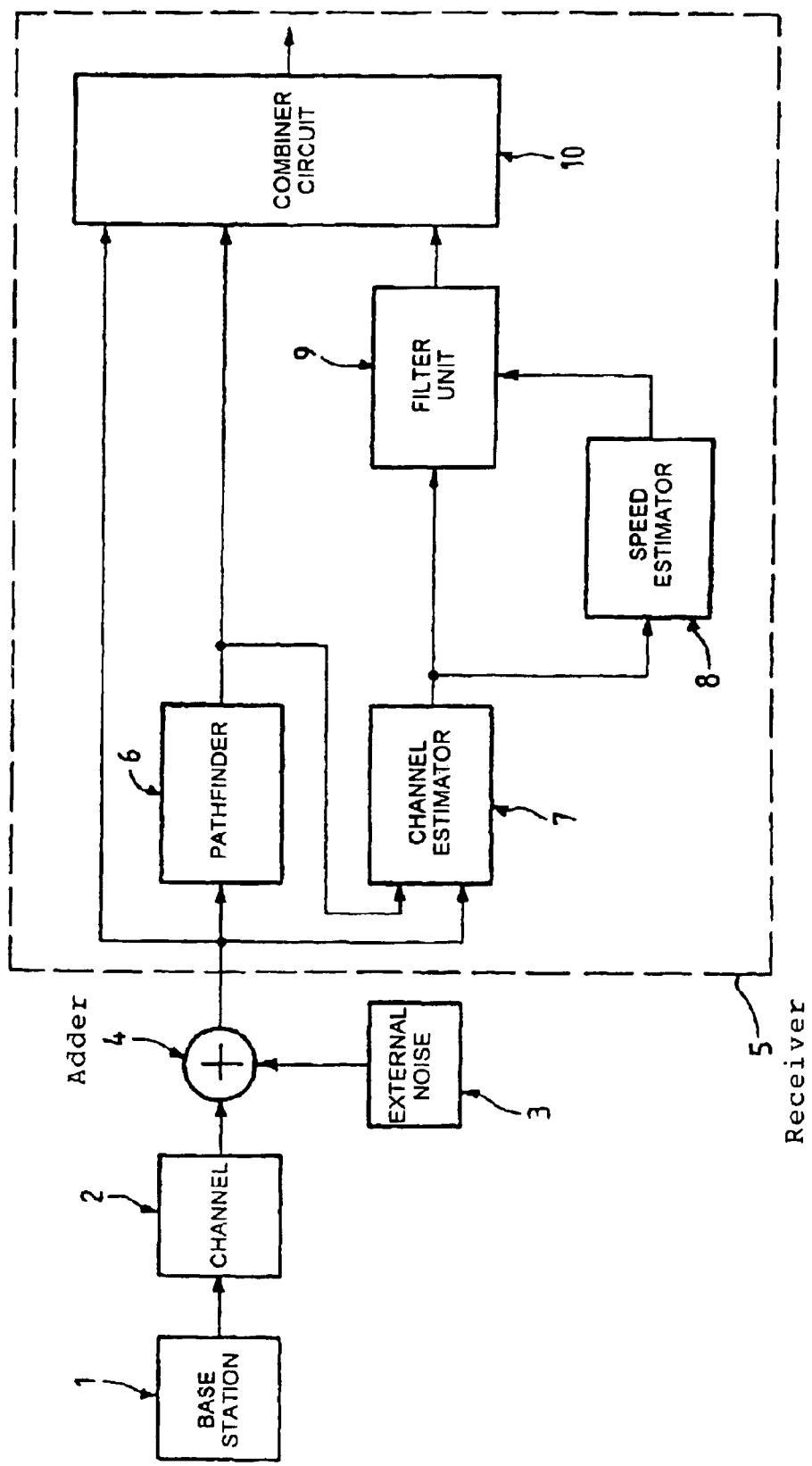

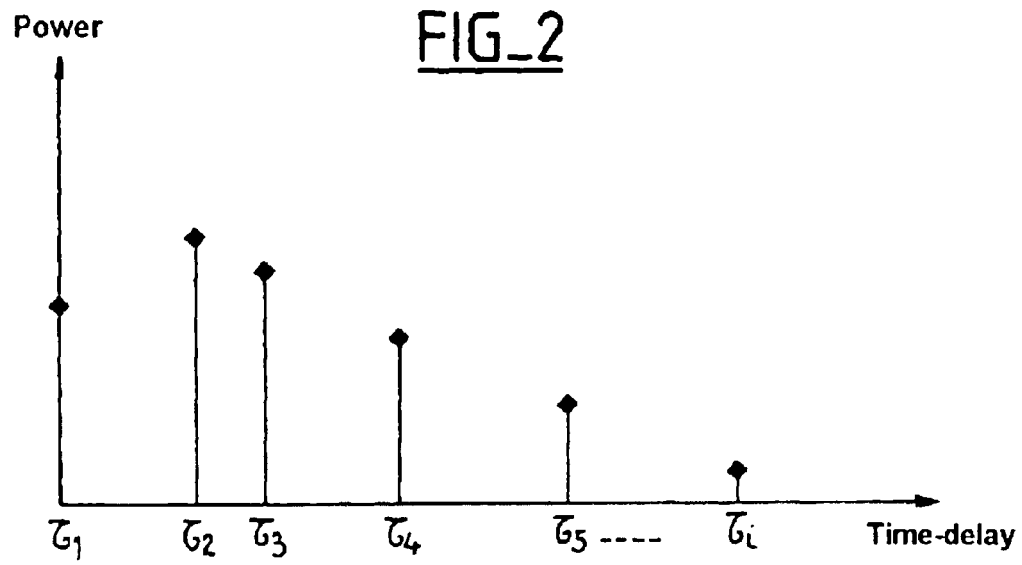
FIG_2
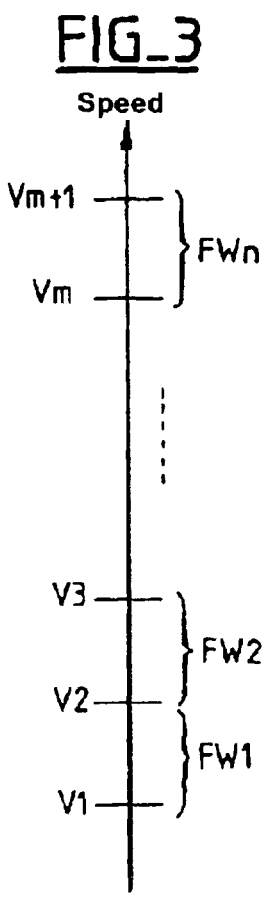
FIG_3

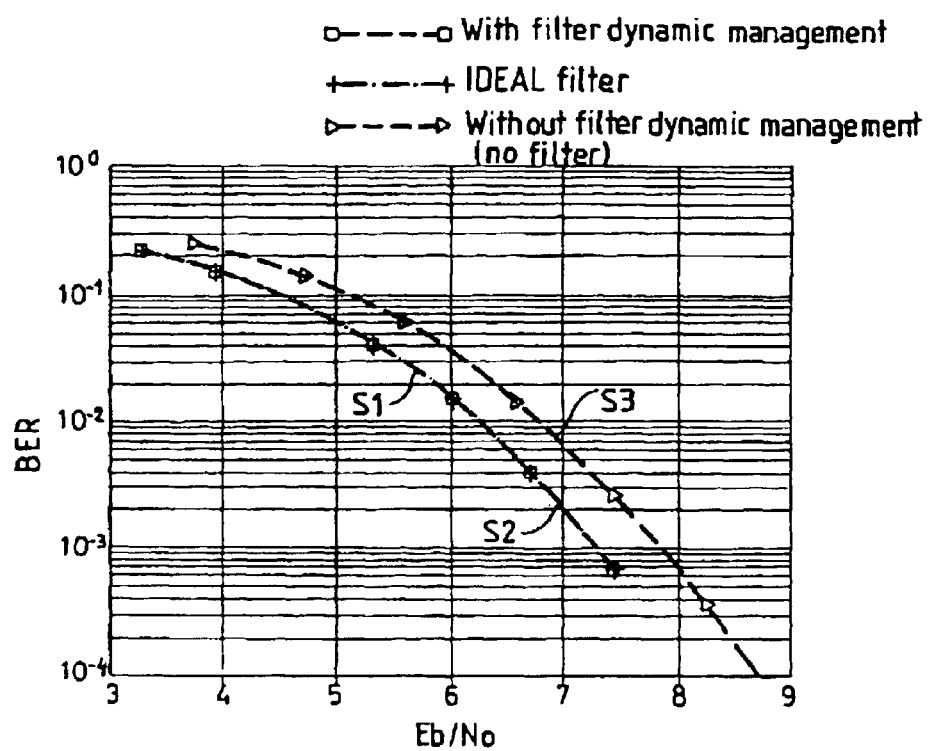
FIG_4

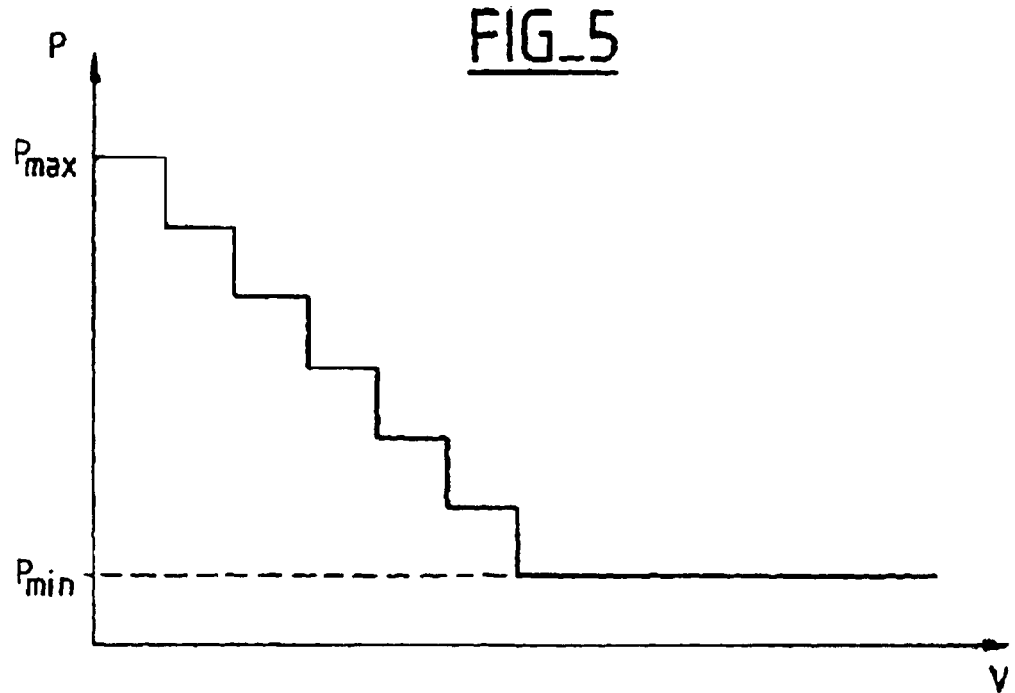
FIG_5
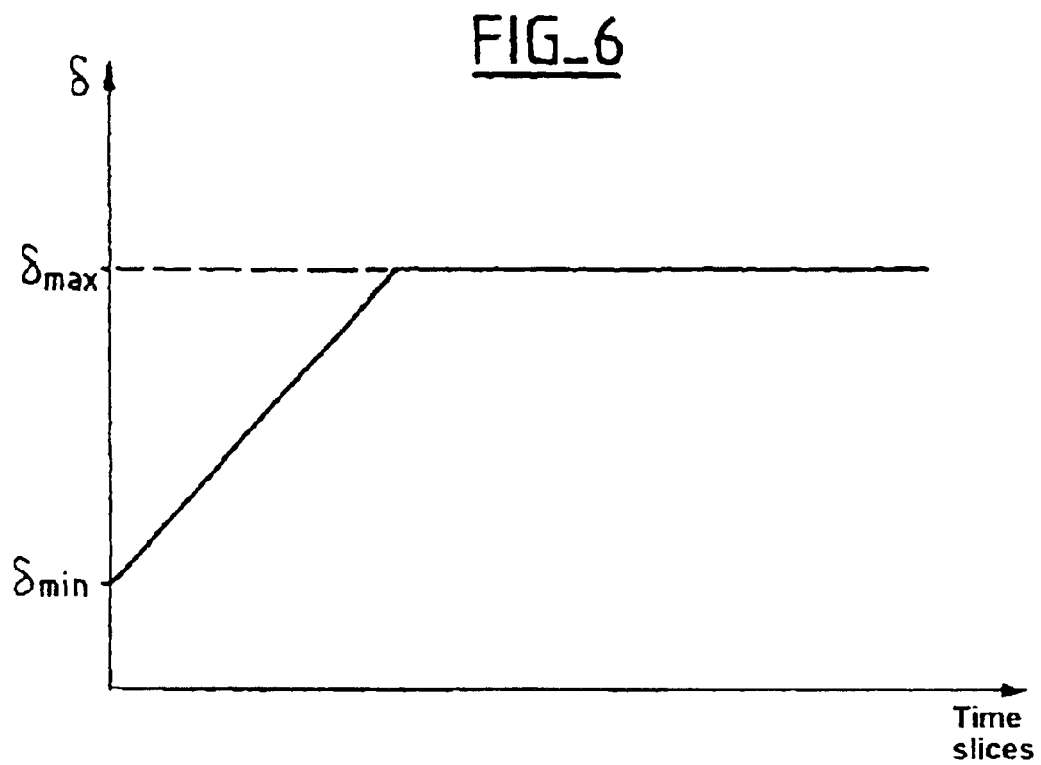
FIG_6

RECEIVER DEVICE FOR A MOBILE RADIOCOMMUNICATION UNIT EMPLOYING A SPEED ESTIMATOR

CROSS-REFERENCE TO RELATED APPLICATIONS

This application is based on French Patent Application No. 00 11 118 filed Aug. 31, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a receiver device for a mobile radiocommunication unit employing a speed estimator.

The invention relates more particularly to the field of telecommunications and especially to the field of radiocommunication terminals.

2. Description of the Prior Art

In radiocommunication terminals, the signals received by the receiver of a mobile receiver unit are degraded because of propagation channel variations. The propagation channel variations depend mainly on the speed of the mobile receiver unit. The channel variations lead to a channel estimation error. The unwelcome consequence of this is that the bit error rate is significantly degraded when the received signal is decoded. Also, a propagation channel estimator can be provided in the structure of the receiver of the radiocommunication terminal in order to take account of amplitude variations of the signal received by the antenna of the receiver due to the speed of the mobile receiver unit.

However, the propagation channel estimator is insufficient for determining the impulse response of the channel with good accuracy. When the speed of the mobile receiver unit increases, the propagation channel varies too quickly for the propagation channel estimator to be able to estimate the frequency and phase variations with sufficient accuracy.

An alternative set out in the patent document GB 2 276 064 consists of using Wiener filtering in the receiver. A Wiener filter is a digital filter with a finite impulse response. The amplitude of the output signal of a Wiener filter is closely related to that of the input signal. In other words, a Wiener filter is a filter in which the output signal at a given time depends only on the input signal at that time.

To alleviate the problem of propagation channel variation and the resulting degraded receiver signals, the patent previously cited discloses the use of a plurality of Wiener filters, each set for a range of contiguous speeds of the mobile receiver device. Selector means select as a function of the speed of the mobile receiver unit the appropriate Wiener filter for maintaining the best possible radio link. Selection is based on detecting the Wiener filter that has the highest output power. According to the teaching of the patent previously cited, it is necessary to use all the Wiener filters of the receiver in parallel and then to select only the filter with the highest output power. Thus all the Wiener filters of the receiver need to be operating at the same time in order to select the right filter.

This makes the solution proposed by the patent document previously cited very complex.

Also, the object of the invention is to alleviate the drawbacks of the prior art by proposing a receiver device whose complexity is very greatly reduced, whilst improving the propagation channel estimates regardless of the speed of the mobile receiver unit.

In fact, for any radiocommunication system, knowing the speed of the mobile receiver unit is very important for improving the quality of service. The speed of the mobile receiver unit induces propagation channel variations which have a direct impact on the channel estimate and consequently on the bit error rate.

To achieve the above object, the invention proposes a receiver device for a mobile radiocommunication unit that includes, on the one hand, a bank of Wiener filters each set for a particular range of speeds and, on the other hand, a mobile receiver unit speed estimator so that the appropriate Wiener filter can be configured automatically and dynamically as a function of the speed of the mobile receiver unit. The speed estimator provides a speed indication to the bank of Wiener filters and therefore enables the Wiener filter suitable for the speed of the mobile receiver unit to be selected. Thus only one Wiener filter operates at a time.

SUMMARY OF THE INVENTION

The present invention provides a receiver device for a mobile radiocommunication unit communicating with a base station via a propagation channel comprising a pathfinder for determining time-delays associated with a multipath signal applied to its input, the multipath signal being also applied to a first input of a combiner circuit and to a first input of a channel estimator, the output of the pathfinder being connected to a second input of the combiner circuit and to a second input of the channel estimator, which channel estimator provides an estimate of the propagation channel to a first input of a filter unit, adapted to provide an optimum estimate of the propagation channel to a third input of the combiner circuit as a function of the speed of the mobile radiocommunication unit, which receiver device further includes a speed estimator for estimating the speed of the mobile radiocommunication unit, whose input is connected to the output of the channel estimator and whose output is connected to a second input of the filter unit, thereby supplying to it the estimated speed of the mobile radiocommunication unit in order to select the appropriate Wiener filter corresponding to the estimated speed.

The invention also provides a method of estimating the speed of a mobile radiocommunication unit in a receiver device communicating with a base station via a propagation channel, which method consists in estimating the speed by measuring the phase difference between two channel coefficients obtained from a channel estimator in accordance with the following equation:

$$V_{n,p} = c \cdot (\phi_{n+p} - \phi_n) / 2\pi \cdot f_c \cdot T_S$$

in which:

Vn,p is the speed at time n, calculated with a difference p between the two phases of the two channel coefficients taken into consideration, c is the speed of light;

$f_c$ is the carrier frequency, $T_S$ is the sampling period of the channel coefficients, $\phi_n$ is the phase of the channel coefficient at time n, and $\phi_{n+p}$ is the phase of the channel coefficient at time n+p.

Other features and advantages of the invention will become more clearly apparent on reading the following description of one particular embodiment, which is given with reference to the drawings.

BRIEF DESCRIPTION OF THE DRAWINGS

FIG. 1 is a diagrammatic representation of a rake receiver in a mobile radiocommunication system in one embodiment of the present invention.

FIG. 2 is a diagram representing for each path the amplitude of the power of the received signal as a function of the time-delay.

FIG. 3 shows the mechanism for assigning Wiener filters in a preferred embodiment of the invention.

FIG. 4 shows performance in terms of bit error rate as a function of signal/noise ratio.

FIG. 5 shows the variations in the difference between two phases to be measured as a function of the speed of the mobile receiver unit.

FIG. 6 shows variations as a function of time of the time constant of a low-pass filter used in the method according to the invention.

DETAILED DESCRIPTION OF THE DRAWINGS

FIG. 1 therefore shows diagrammatically an embodiment of the present invention in which a mobile telecommunication system uses a rake receiver.

A base station 1 transmits signals in all directions to all radiocommunication terminals inside its coverage area. The radio waves are transmitted via a propagation channel 2. The propagation channel 2 corresponds to the path followed by the radio waves between their point of transmission and their point of reception. The signals transmitted are affected by Gaussian additive white noise 3. The amplitude and time-delay values of the impulse response of the propagation channel 2 are a function in particular of the environment, i.e. of the region of the globe concerned. The processing of the external noise 3 is modeled by an adder 4 in which the signal from the propagation channel 2 is added to the external noise 3. The signal modeled in this way reaches a receiver device 5.

The signal modeled in this way includes the wanted signal and takes account of the external noise. It is applied to the single input of a pathfinder circuit 6, to a first input of a channel estimator 7, and to a first input of a combiner circuit 10. The pathfinder circuit 6 has an output connected to a second input of the speed estimator 7 and to a second input of the combiner circuit 10.

The channel estimator 7 has an output connected, on the one hand, to a first input of a filter unit 9 which, in a preferred embodiment of the invention, is made up of a plurality of Wiener filters, i.e. constitutes a Wiener filter bank, and, on the other hand, to a single input of a mobile receiver unit speed estimator 8. The speed estimator 8 has an output connected to a second input of the filter unit 9 consisting of a plurality of Wiener filters.

The filter unit 9 has an output connected to a third input of the combiner circuit 10.

The pathfinder circuit 6 cooperates with the channel estimator 7 to determine the profile of the transmission channel in terms of its time-delay, phase and amplitude.

In fact, the device according to the invention is part of a radiocommunication system employing multipath propagation. The radio signal therefore propagates along one or more paths, one of which is the shortest path connecting the point of transmission, the base station 1, to the point of reception, the receiver 5, and the others of which are due to obstacles from which the waves ricochet before reaching the receiver 5 with phases different from that of the wave that took the shortest path. The reflected waves travel distances different from that traveled by the direct wave and their phases therefore lag relative to the phase of the direct wave.

What is more, the waves arriving with a time-delay have taken a longer path and are consequently more attenuated, which means that their amplitudes are different.

The signal therefore reaches the mobile receiver unit with phase and amplitude distortion.

The function of the pathfinder circuit 6 is then to estimate the time-delays in the transmission of the signals due to the multipath phenomenon explained hereinabove. To do this, the circuit 6 deduces the time-delays from a power estimate for each path. The pathfinder circuit 6 receives at its input the multipath signal and delivers at its output, after processing in a manner that is known in the art, using various algorithms, the power profile of the signal over a certain time, as shown in FIG. 2. The circuit 6 uses in particular means for correlating the pilot sequence of the mobile receiver unit with the received signal.

FIG. 2 is a diagram representing for each path the amplitude of the powers of the received signals as a function of the time-delays. The time-delays are plotted on the abscissa axis and for each time-delay value $\tau 1$, $\tau 2$, $\tau 3$, $\tau 4$, $\tau 5 \ldots \tau i$ there is a corresponding power amplitude plotted on the ordinate axis. The signals represented convey the same information, and simply arrive at the receiver with time, phase and amplitude differences. Usually, the greater the time-delay on a given path, the greater the attenuation of the power amplitude of the signal received at the receiver. For example, the power of the received signal has a lower amplitude for the path that has a cumulative time-delay $\tau i$ relative to the first path, which means that the wave i has taken a long path and/or been subjected to attenuation due to the environment before reaching the mobile receiver unit. These paths are not taken into account hereinafter. In fact, by means of other algorithms, a decision is taken to fix a particular threshold and to retain only paths that have a power level greater than the noise, i.e. those which must be used to maintain communication between the base station 1 and the receiver 5.

Once the various time-delays have been determined, by means of the processing carried out by the pathfinder circuit 6, the channel estimator 7 comes into play and supplies a first estimate of the impulse response of the propagation channel. In other words, the function of the channel estimator 7 is to determine the amplitude and the phase of each path. To meet this objective, it is necessary for the input of the channel estimator 7 to receive the multipath signal and the time-delays calculated by the pathfinder circuit 6. The values of the time-delays for the various paths $\tau 1$, $\tau 2$, $\tau 3$, $\tau 4$, $\tau 5 \ldots \tau i$, as discussed with reference to FIG. 2, must therefore be supplied to the channel estimator 7 by the pathfinder circuit 6. In fact, the channel estimator 7 must know the value of the time-delay $\tau$ of each path in order to be able to determine the amplitude and the phase of the signal for each path.

Based on the above data, the channel estimator 7 knows that there is a path at $\tau 1$, at $\tau 2$, ... at $\tau i$. It then calculates the amplitude and the phase of the multipath signal at times $\tau 1$, $\tau 2$, ... $\tau i$. The amplitude and the phase for each path are then represented by a coefficient.

The amplitude and phase coefficients are then supplied to the speed estimator 8. The speed estimator 8 uses the path coefficients calculated by the channel estimator 7 to estimate the speed of the mobile receiver unit. In a different embodiment, the speed estimator could use the path having the highest power to estimate the speed of the mobile unit, rather than using all the paths.

The amplitude and phase coefficients have a phase that varies as a function of the Doppler effect due to the speed of the mobile receiver unit. The speed estimator 8 therefore measures the phase variation, which is closely related to the speed of the mobile receiver unit. The operation of the speed estimator is described in detail next with reference to FIGS. 5 and 6 in particular.

The speed estimator 8 then supplies the estimate of the speed of the mobile receiver unit to the unit 9 which, in this embodiment, comprises a plurality of Wiener filters. The most appropriate Wiener filter coefficients are deduced from the speed estimate. In fact, there is one filter that corresponds to each speed. The objective of the Wiener filtering is to filter the channel coefficients.

There are various ways to assign a filter as a function of the speed. In theory, a suitable Wiener filter would be required for each speed. However, this kind of solution would entail long calculations to discover the filter exactly matched to the speed and would therefore be costly in terms of processing time.

A bank of Wiener filters is then used, in which each filter is matched to a different range of contiguous speeds. A particular filter is used when the speed of the mobile receiver unit is inside a predetermined speed range.

FIG. 3 shows the mechanism for assigning the Wiener filters in a preferred embodiment of the invention. FIG. 3 shows a scale of speeds, representing different speeds of the mobile receiver unit: V1, V2, V3 ... Vn, Vn+1. Accordingly, if the speed of the mobile is within a range [V1,V2[ of speeds between V1 and V2 exclusive, the appropriate Wiener filter to use is the filter FW1; if the speed of the mobile is within a range [V2,V3[ of speeds between V2 and V3 exclusive, the appropriate Wiener filter to use is the filter FW2; and so on, so that if the speed of the mobile is within a range [Vn,Vn+1[ of speeds between Vn and Vn+1 exclusive, the appropriate Wiener filter to use is the filter FWn.

Consequently, thanks to the speed estimator 8, which supplies an estimate of the speed of the mobile receiver unit to the unit 9 containing the bank of Wiener filters, it is possible to configure the Wiener filter appropriate to the speed automatically and dynamically. Thus the parameters of the Wiener filter used are set by the speed estimate.

The Wiener filter selected in this way by the speed estimator 8 then filters the channel coefficients from the channel estimator 7 in a manner that is appropriate to the speed. This filtering provides the filtered channel coefficients and thereby corrects the channel coefficient estimation error.

Thereafter, once filtering has attenuated the channel estimation errors, the combiner circuit 10 combines all the preceding paths into a single path in a coherent manner, i.e. correcting phase errors and time-delays. The combiner circuit 10 delays the signals that arrive first in order to process those that arrive with a delay afterward so that they can all be combined at the same time, with their phase corrected.

It is therefore necessary for the input of the combiner circuit 10 to receive the multipath signal, the time-delays calculated by the pathfinder circuit 6, and the channel estimates from the channel estimator 7 that have been subjected to Wiener filtering in the filter unit 9.

A signal is obtained at the output of the combiner circuit 10 that is combined with the maximum power coherently, and therefore with no phase error. Demodulation can then begin to recover the data bits.

The receiver device in accordance with the present invention, which uses a Wiener filter whose parameters are set by a speed estimator, improves reception much better than prior art receiver devices. This is described with reference to FIG. 4, which shows performance in terms of the bit error rate (BER) as a function of the signal/noise (energy bit/noise) ratio Eb/No at the receive antenna of the mobile receiver unit when the mobile receiver unit is traveling at 37.5 kilometers per hour. The error rate represents the percentage of errors in the digital signal received by the mobile receiver unit.

In FIG. 4, a first curve SI corresponds to the performance in terms of the BER as a function of the ratio Eb/No when a Wiener filter whose parameters have been set by the speed estimator, i.e. in accordance with the present invention, is used in the mobile receiver unit. A second curve S2 corresponds to performance in terms of the BER as a function of the ratio Eb/No if an ideal filter matched to the exact speed of 37.5 kilometers per hour is used in the mobile receiver unit. The curves S1 and S2 are the same. Finally, a curve S3 corresponds to performance in terms of the BER as a function of the ratio Eb/No if no Wiener filter is used.

A BER of $10^{-3}$ is considered by way of example. A BER of $10^{-3}$ means that the required quality of service corresponds to one wrong data bit every thousand bits.

For a BER of $10^{-3}$, the signal/noise ratio Eb/No for the curve S1, representative of the situation in which a Wiener filter whose parameters have been set by the speed estimator is used, is 7.2 decibels. For the curve S2, representative of the ideal filter, the ratio Eb/No is also 7.2 decibels for a BER of $10^{-3}$. Thus, by using a Wiener filter whose parameters are set by the speed estimator, the same performance is obtained as with the ideal filter.

In contrast, for the curve S3, representative of the situation in which no Wiener filter is used, the ratio Eb/No is 7.7 decibels, i.e. 0.5 decibels worse than for the curve S1. Thus, in this case, to obtain the same quality of service, it is necessary to provide a higher base station and mobile transmit power.

Using in the mobile receiver unit a Wiener filter whose parameters are set by the speed estimator, i.e. in accordance with the present invention, obtains a power saving of 0.5 decibels at 37.5 kilometers per hour and therefore enables the base station to transmit at a lower power. This phenomenon has a particular importance in the context of the universal mobile telecommunication system (UMTS) standard, in accordance with which the number of users for a base station is intimately related to the transmit power. Accordingly, the lower the transmit power, the greater the number of users for the same base station.

The speed estimator is described in more detail next with reference to FIGS. 5 and 6 in particular. The speed is estimated by means of a simple process that is suitable for any type of propagation channel.

To improve the quality of service it is very important to know the speed of the mobile receiver unit. In fact, the speed of the mobile receiver unit causes channel variations and this has a direct impact on the channel estimate and consequently on the bit error rate BER. To improve reception quality, a channel estimate is employed, followed by Wiener filtering of the impulse response of the propagation channel. However, if high processing performance is to be obtained, the Wiener filter to be used must be matched to the speed of the mobile receiver unit. This is why, in accordance with the invention, a speed estimator is used in the receiver device to set the parameters of the Wiener filter to be used.

The method according to the invention is based on the principle of the Doppler frequency which, as is well known, is related to the speed of the mobile receiver unit. The speed of the mobile receiver unit is related to the propagation channel variations, which variations cause distortion of the signal, in particular phase variation.

Accordingly, the method of estimating the speed consists in measuring the Doppler frequency by calculating the phase difference between two channel coefficients. The method in accordance with the invention uses the channel impulse response from the channel estimator to measure the phase difference between the impulse responses of two channels. Equation 1 below shows the relation between the channel estimate phase difference and the speed of the mobile receiver unit:

$$Vn,p = c \cdot (\phi_{n+p} - \phi_n) / 2\pi \cdot f_c \cdot T_S \quad \text{equation 1}$$

in which:

Vn,p is the instantaneous speed at time n, calculated with a phase difference p between the phases of the two channel estimates taken into consideration;

c is the speed of light;

$f_c$ is the carrier frequency, of the order of 2 GHz in a UMTS system;

$T_S$ is the sampling period of the channel coefficients and in this example represents 666 microseconds;

$\phi_n$ is the phase of the channel coefficient at time n; and $\phi_{n+p}$ is the phase of the channel coefficient at the time n+p.

To estimate the speed in this way, it is therefore necessary first to store channel coefficients from the channel estimator.

A first step of the speed estimation method in accordance with the invention consists in adaptive measurement of the speed as a function of the power profile of the multipath signal, as shown in FIG. 2. Indeed, when the signal/noise ratio Eb/No is too low, the signal cannot be distinguished from noise. The speed measurement is then not representative and may be totally erroneous.

To estimate a representative speed of the mobile receiver unit, a speed is measured for each path i, as shown in FIG. 2. This measurement of the speed on each path is performed in accordance with equation 1. All the paths can be taken into account, or just a few paths.

A final estimate of the speed is then obtained by weighting the estimated speed on each path as a function of the power. The various speeds are therefore combined as a function of the power profile of the multipath signal, in accordance with the following equation:

$$\hat{V}n, p = \frac{\sum_{i=1}^{N} \hat{V}n, p, i \cdot \alpha i}{\sum_{i=1}^{N} \alpha i}$$

in which:

$\hat{V}n, p$ is an estimate of the instantaneous speed obtained by means of the speeds $\hat{V}n,p,i$ extracted from the measurements performed on the various paths i, and $\alpha i$ are coefficients between 0 and 1, calculated as a function of the amplitude of the power of each path i.

To calculate the coefficients $\alpha i$, the average power can be measured on each path with a first order filter. Accordingly, each coefficient $\alpha i$ is calculated as a function of the average power $P_{i,avg}$ and the instantaneous power $P_{i,inst}$ of the path i. If the instantaneous power is below a particular threshold relative to the average power, the corresponding estimated speed is not taken into account.

In this first step, the speed is therefore estimated taking the power profile of the multipath signal into account.

Estimating the speed on each path entails several operations.

Accordingly, a second step consists in estimating the phase variation and adapting p as a function of the speed of the mobile. The value p corresponds to the difference expressed as the number of samples between the two phases to be measured to calculate the phase difference. One is taken at time n and the other at time n+p. Varying p as a function of the speed of the mobile enables the phase variation to be calculated under all circumstances, regardless of the Doppler frequency variation.

FIG. 5 shows the variation of p as a function of the speed V. The value of p is between $p_{min}$ and $p_{max}$, depending on the value of the speed. If the speed V is low, p is large and is equal to $p_{max}$; thereafter, as the speed increases, p decreases to the value $p_{min}$.

The value of p can be calculated using a linear function of the type $p = A \cdot V_{n,p} + B$, in which A and B are constants and p is an integer. This relation between p and the speed must be seen as an example and is in no way limiting on the invention. Any other equation establishing a variation of p as a function of the speed can be envisaged.

Accordingly, measuring the speed using two channel coefficients spaced by a number of samples equal to p, where p is matched to the speed, reduces the average estimation error due to the Gaussian additive white noise operative on the channel coefficients. The following equation shows the reduction of the average error:

$$\hat{V}n,p = Vn,p + K \cdot (\epsilon + n)/p$$

in which:

$\epsilon$ is the average estimation error dependent on the speed;

n is Gaussian noise;

$K = c/(2\pi \cdot f_c \cdot T_s)$; and $\hat{V}n,p$ is the estimate of the speed at time n and Vn,p the real speed. The speed estimate is therefore equal to the real speed plus a certain error.

Here p is a divisor of the average error. Dividing by p reduces the average error.

A third step consists in calculating the instantaneous speed in accordance with equation 1 above.

A fourth step consists in averaging the estimates of the instantaneous speed using a filter to limit the noise n. In a preferred embodiment of the invention, this filtering can be applied by means of a low-pass filter with time constant δ.

Finally, a fifth step improves the convergence of the algorithm when it is launched.

FIG. 6 shows this fifth step. FIG. 6 shows the variations in the time constant δ of the low-pass filter used in the preceding step as a function of time, to be more precise as a function of time slices. In fact, as explained above, the channel coefficients from the channel estimator are discrete and therefore sampled with an increment $T_s$.

The time constant δ therefore varies between τmin and τmax. Initially, the time constant δmin is low, which corresponds to fast convergence, enabling the value of the average speed step to be achieved fairly quickly. Thereafter, the value of δ increases as a function of the time slices up to the value δmax, thereby reducing fluctuations due to noise.

Dynamic management of the time constant of the instantaneous speed filter therefore improves the convergence of the algorithm in a number of time slices.

What is claimed is:

1. A receiver device for a mobile radiocommunication unit communicating with a base station via a propagation channel comprising a pathfinder for determining time-delays associated with multipath signals applied to the pathfinder's input, said multipath signals being also applied to a first input of a combiner circuit and to a first input of a channel estimator, the output of said pathfinder being connected to a second input of said combiner circuit and to a second input of said channel estimator, which channel estimator provides an estimate of said propagation channel to a first input of a filter unit, adapted to provide an optimum estimate of said propagation channel to a third input of said combiner circuit as a function of a speed of the mobile radiocommunication unit, wherein said receiver device further includes a speed estimator for estimating the speed of said mobile radiocommunication unit, the input of said speed estimator being connected to the output of said channel estimator and the output of said speed estimator being connected to a second input of said filter unit, thereby supplying to it the estimated speed of said mobile radiocommunication unit in order to select the appropriate Wiener filter corresponding to the estimated speed.

2. The device claimed in claim 1, wherein said filter unit is made up of a plurality of Wiener filters.

3. The device claimed in claim 2, wherein each Wiener filter of said filter unit is matched to a different range of contiguous speeds of said mobile radiocommunication unit.

4. A method of estimating the speed of a mobile radiocommunication unit in a receiver device claimed in claim 1, which method comprises estimating said speed by measuring a phase difference between two channel coefficients obtained from a channel estimator in accordance with the following equation:

$$V_{n,p} = c \cdot (\phi_{n+p} - \phi_n)/(2\pi \cdot f_c \cdot T_S)$$

in which:

$V_{n,p}$ is a speed at time n, calculated with a difference p between phases of the two channel coefficients taken into consideration, c is the speed of light;

$f_c$ is a carrier frequency, $T_S$ is a sampling period of the channel coefficients, $\phi_n$ is a phase of the channel coefficient at time n, and $\phi_{n+p}$ is a phase of the channel coefficient at time n+p.

5. The method claimed in claim 4, which includes the following steps:
a) adaptively measuring said speed as a function of a power profile of a multipath signal;
b) estimating a phase variation and adapting the difference between the two phases to be measured as a function of said speed of said mobile radiocommunication unit, so as to reduce an average estimation error of said channel coefficients;
c) calculating an instantaneous speed;
d) averaging said instantaneous speed by means of a filter; and
e) improving a convergence time of the speed estimate.

6. The method claimed in claim 5, wherein step b) reduces the average estimation error by dividing it by the difference.

7. The method claimed in claim 5, wherein step d) consists in using a low-pass filter.

8. The method claimed in claim 5, wherein step e) consists in varying a time constant of the filter used in step d) as a function of time.

* * * * *